July 1, 1958 L. D. SOUBIER 2,840,952
GLASS TUBE SCORING DEVICE
Filed Jan. 6, 1954 2 Sheets-Sheet 1

INVENTOR.
LEONARD D. SOUBIER
BY
Rule and Hoge.

INVENTOR.
LEONARD D. SOUBIER

United States Patent Office 2,840,952
Patented July 1, 1958

2,840,952

GLASS TUBE SCORING DEVICE

Leonard D. Soubier, Toledo, Ohio, assignor to Owens-Illinois Glass Company, a corporation of Ohio Application January 6, 1954, Serial No. 402,451

12 Claims. (Cl. 49—29)

My invention relates to an apparatus for use in scoring articles formed of glass or other moldable or plastic material as a preliminary step in the process of removing the rim portion or moil from a molded article. The invention as herein illustrated and described, is used for scoring iconoscopes or television tubes while in the mold in which they are formed, although the invention is not limited to this particular use, nor to apparatus designed for such use.

One method in use at the present day for scoring such tubes consists in holding a scoring disc in contact with the tube at the plane of severance while the tube is still in the mold in which it is formed, and while the mold with the tube therein is rotated. Such a method and apparatus have been found deficient in certain respects, particularly as the scoring disc or cutter makes a poor or imperfect score, and also with such mechanism there is jumping or vibration to an excessive and objectionable degree.

An object of the present invention is to provide an apparatus which overcomes such deficiencies and produces a smooth, sharp score of uniform and adequate depth.

The apparatus is used with a mold in which a television tube or other article is formed by introducing a charge or gob of molten glass or plastic material into the mold, rotating the mold at a high speed about a vertical axis and thereby spinning the material, spreading it over the inner mold wall. The material is thus carried upwardly in a sheet or layer of the desired thickness molded to the required shape but with an upper rim portion or moil which must be removed.

After the tube is thus molded the scoring device is lowered into the open upper end of the mold. Such device comprises a pair of arms each carrying a scoring roll or disc. The arms are projected horizontally outward and the scoring rolls thereby brought into contact with the molded article at the score line and held with a yielding pressure against the surface to be scored while the mold is rotated, so that the rolls traverse said surface in the plane of the required score line. The leading roll cuts or forms a relatively blunt and shallow score. The second roll following in the score or track produced by the first cutter imparts a fine hairline type of score while simultaneously increasing the depth of the final score. The pressure applied to the discs during the scoring operation may be pneumatic pressure supplied, for example, by air-operated piston motors or cylinders, or spring pressure may be employed.

Referring to the accompanying drawings.

Figure 1:
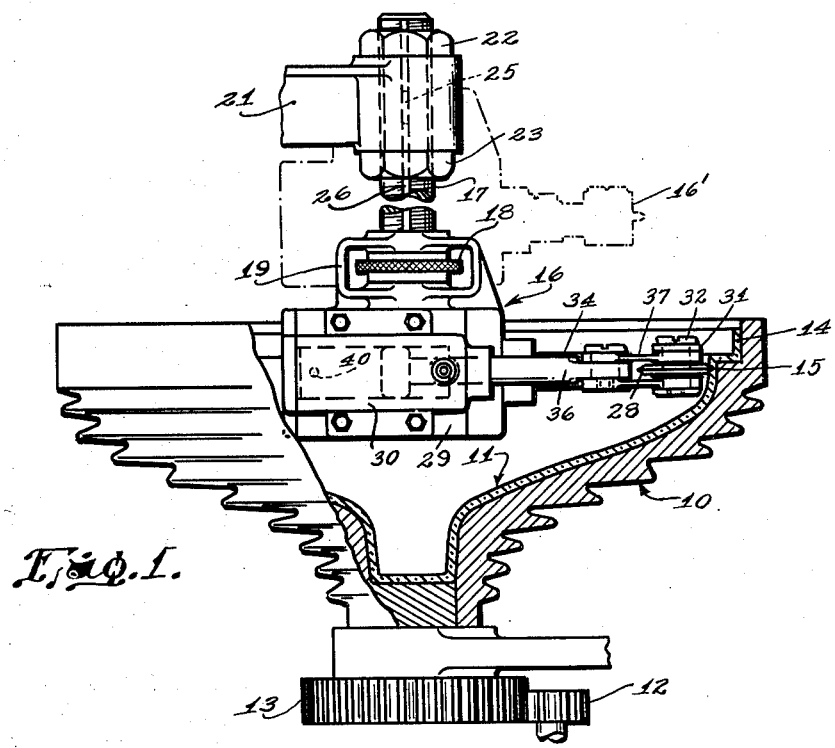
Fig. 1 is a part-sectional elevational view, with parts broken away, of a mold with a television tube therein and the scoring apparatus in operative position.
Figure 2:
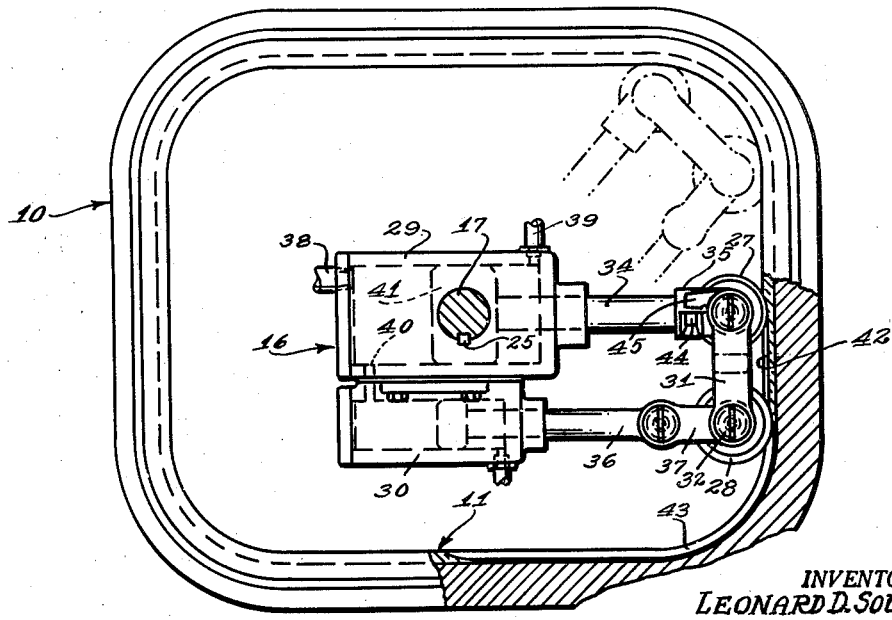
Fig. 2 is a part-sectional plan view of the same.

Referring to Figs. 1 and 2, a mold 10 in which the tubes are formed is mounted for rotation about its vertical axis for molding the tube 11. Rotation of the mold is effected by power supplied through a driving pinion 12 which drives a gear 13 connected to the mold. When a charge of plastic or moldable material, herein shown as glass, is placed within the mold, the latter is rotated at a high speed thereby spinning or shaping the material by centrifugal force, causing it to spread and travel upwardly over the inner wall surface of the mold. The upper rim portion 14 or moil with its irregular surface must be removed.

The present invention provides means for scoring the glass at the score line 15 in a horizontal plane just beneath the rim portion 14. The scoring device 16 is mounted on a vertical shaft 17 which is screw-threaded throughout its length to permit vertical adjustment of the scoring apparatus bodily. An adjusting ring 18 threaded on the shaft 17 is mounted in a bracket 19 which is attached to the scoring apparatus. The ring 18 serves as a fine adjustment means for positioning the scoring rolls. The shaft 17 is mounted in a frame or arm 21 which forms a carrier for the scoring apparatus. The frame 21 is movable up and down for lowering the scoring apparatus to operative position within the mold, and for lifting it to the broken line position 16', and may also be moved laterally to position the apparatus at the side of the mold. The shaft 17 is adjustable up and down within the carrier 21 and held in adjusted position by nuts 22 and 23. Spline keys 25 in a keyway 26 prevent oscillation or rotating movement of the apparatus relative to the shaft 17.

Two scoring rolls or discs 27 and 28 are operatively connected respectively to air cylinders 29 and 30 by which the rolls are yieldingly held under pneumatic pressure against the glass during the scoring operation. The rolls are carried in a yoke 31 (see Fig. 3) by pivot pins 32 on which the rolls are mounted for free rotation. The piston rod 34 of the motor 29 has attached thereto at its outer end a fork 35 which straddles the roll 27 and through which the pivot pin extends and pivotally connects the piston rod to the yoke 31. The piston rod 36 of the motor 30 is conected to the yoke 31 through a pair of links 37.

Air under pressure for operating the two air motors is supplied through a pipe 38 to the cylinder 29 and projects the scoring roll 27 to operative position while the air in front of the motor piston is exhausted through a pipe 39. Air pressure for operating the cylinder 30 is transmitted from the cylinder 29 through a port 40 which provides communication between the two cylinders. The port 40 is located a short distance in advance of the rear cylinder heads and therefore is closed by the piston 41 while the latter is fully retracted. With this arrangement when air pressure is transmitted through the pipe 38, the piston 41 and scoring roll 27 are moved forward in advance of the other piston and scoring roll 28. This takes place as hereinafter described while the mold 10 and a tube therein are rotating so that the scoring roll 27 forms an initial score line in advance of the roll 28, thus forming a track in which the roll 28 follows. The piston rods 34 and 36 are substantially parallel and transmit pressure to the scoring rolls in the same general direction, both rolls being on the same side of the shaft 17 or of the vertical plane of said shaft perpendicular to the piston rods.

Figure 3:
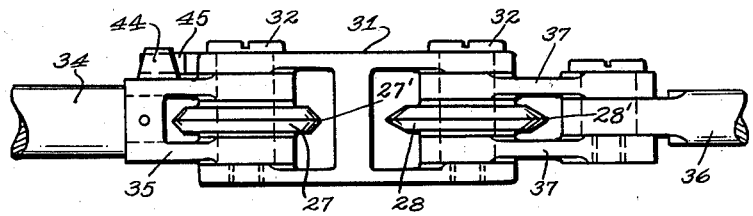
Fig. 3 is an elevational view of the scoring discs and the linkage by which they are carried.
Figure 4:
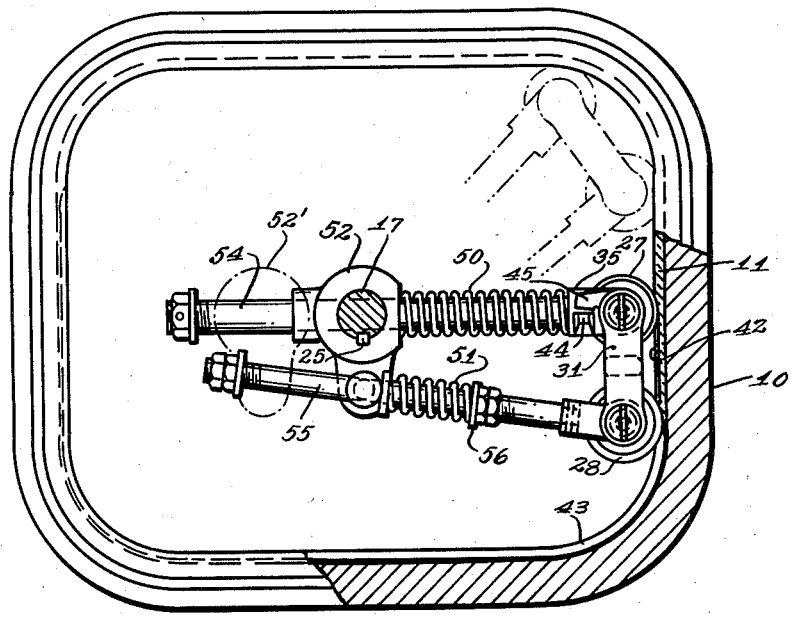
Fig. 4 is a view similar to Fig. 2, of a modification in which coil springs are used as a substitute for the air motors.

As shown in Fig. 3, the scoring edge 27' of the leading roll 27 may be more blunt than the edge 28' of the follower roll 28. The roll 27 makes a comparatively shallow score or groove 42 (Figs. 2 and 4). The roll 28 follows in this comparatively shallow groove and completes the score 43 by cutting more deeply into the glass along a comparatively fine hairline. The outward swinging movement of the yoke 31 while the rolls are out of contact with the glass is limited by stop lugs 44 and 45 (Fig. 3) on the fork 35 and yoke 31.

The operation is as follows:

The tube 11 is spun within the mold by rotating the latter at a high speed about its vertical axis while the scoring apparatus is positioned above and entirely outside of the mold or at one side thereof, with the scoring rolls in their retracted position as indicated in broken lines in Fig. 1. After the tube is thus molded and while the glass is still hot and plastic, the scoring apparatus is brought directly over the mold and lowered to operative position with the scoring rolls in the plane of the required score line. Air pressure is then supplied through the pipe 38 (Fig. 2) behind the piston 41 and thereby projects the leading roll 27 into contact with the glass while the mold is being rotated at a moderate speed about its vertical axis. The roll 28 is also projected by its motor 30 but lags behind the roll 27 as heretofore described so that the roll 27 forms an initial groove 42 in which the roll 28 runs to complete the score. As the tube is non-circular, approaching a rectangular form, the scoring rolls do not run in a circular path but are projected outwardly for scoring the corner portions of the tube and retracted for forming the side and end portions. The pneumatic pressure supplied through the pipe 38 maintains a substantially constant pressure of the rolls throughout the entire scoring operation, the greater pressure being applied to the leading roll 27. The rolls are held in scoring position throughout at least a complete rotation of the tube about its vertical axis and the operation may be continued longer if desired. When the scoring is completed the air pressure within the cylinders is reversed, the rolls retracted and the apparatus lifted to clear the mold. The moil 14 can be completely severed from the scored tube by any approved or conventional method, forming no part of the present invention.

Fig. 4 illustrates a modification in which coil springs 50 and 51 are used as a substitute for the air cylinders 29 and 30 respectively. In this construction a head or carrier 52 is mounted on the shaft 17 and may be adjusted vertically for adjusting the scoring discs, in the same manner as described in connection with the form shown in Fig. 1. The spring 50 is carried on a horizontal rod 54 mounted for horizontal reciprocation within the head 52 and is held under compression between said head and the fork 35. The coil spring 51 is mounted on a rod 55 having a sliding connection with the head 52 and is held under compression between said head and an adjustable collar 56. The scoring rolls are retracted, to permit movement of the scoring device into and out of operative position, by shifting the shaft 17 and head 52 laterally to the broken line position 52'.

Modifications may be resorted to within the spirit and scope of my invention.

I claim:

1. Apparatus for scoring the inner surface of a hollow body of plastic material, said apparatus comprising a plurality of scoring elements, means for holding said scoring elements in contact with said surface at a scoring plane with one element in advance of another in said plane and pressing the scoring elements against said surface with the pressure applied to both scoring elements in the same general direction, and means for causing a relative rotation of the said hollow body and the scoring elements about an axis within the perimeter of said surface and perpendicular to said plane and thereby causing the scoring elements to traverse said surface and produce a score at said plane, the scoring elements being on the same side of said axis with one scoring element following in the track of another and thereby progressively deepening the score, the said scoring elements consisting of scoring rolls including a leading roll with a comparatively blunt scoring edge for forming the initial score, and a follower roll with a sharper scoring edge for following in and deepening the initial score.

2. The apparatus defined in claim 1, the means for holding the scoring elements in contact with said surface comprising pneumatic motors operable to hold the scoring elements in contact with said surface with a yielding pneumatic pressure maintained during the scoring operation.

3. The apparatus defined in claim 1, the means for holding the scoring elements in contact with said surface comprising springs under compression and applying a yielding pressure to the scoring elements during the scoring operation.

4. An apparatus for scoring the inner surface of a hollow molded article of plastic material, said apparatus including a scoring device comprising a plurality of scoring elements, means for positioning the scoring device within the molded article, said scoring device including means for projecting the scoring elements into contact with said surface at a scoring plane and holding said elements with a yielding pressure against said surface, and means for effecting a relative rotation of the article and scoring device about an axis within the perimeter of said surface and perpendicular to the said plane and thereby causing the scoring elements to traverse said surface and produce a score while the scoring elements advance along the score line with one scoring element following in the track of another so that the score is progressively deepened by the said elements, the scoring elements being positioned at the same side of said axis and spaced apart a distance substantially less than the distance between said axis and the scoring elements, the scoring elements comprising a leading disk and a follower disk, said disks having their peripheries tapered to form scoring edges, the leading disk being formed with a comparatively blunt scoring edge for forming the initial score during said relative rotation of the article and scoring device, and the follower disk being formed with a sharper scoring edge for following in and deepening the initial score formed by the leading disk, and a yoke connecting said disks and in which the disks are mounted for free rotation about their axes.

5. The apparatus defined in claim 4, the means for projecting and holding the discs against said surface comprising fluid operated piston motors individual to said discs.

6. The combination with means for supporting a hollow open-ended plastic article for rotation, of a scoring apparatus for forming a score in the interior surface of the article, said scoring apparatus comprising a holder, arms extending laterally and in the same general direction from said holder, a pair of scoring discs, a yoke in which the discs are pivotally mounted for rotation about their axes, said discs having scoring edges rotating in the same plane, means for pivotally connecting one of said arms at its outer end to one of said discs, a link pivotally connecting the other disc to the other said arm at its outer end, means for applying a yielding pressure to said arms in the direction in which they extend from said holder and thereby holding the scoring discs with a yielding pressure against said surface, and means for rotating the article about an axis parallel with the axes of the discs and within the perimeter of said surface, thereby causing the discs to travel in the same path and form a score.

7. The apparatus defined in claim 6 including piston motors, said arms forming the motor piston rods.

8. The apparatus defined in claim 6, the means for applying a yielding pressure to said arms comprising coil springs mounted on said arms and held under compression.

9. The combination with an open-ended mold mounted for rotation about a vertical axis for molding a plastic hollow article therein, of apparatus for scoring the inner surface of the article while the latter is within the mold, the scoring apparatus comprising piston motors, a carrier for said apparatus, the motors including piston rods, a yoke, scoring discs pivotally mounted within said yoke for rotation about their vertical axes, said discs having peripheral scoring edges in the same horizontal plane, a fork pivotally connecting one end of the yoke with one piston rod, links pivotally connecting the other end of the yoke with the other piston rod, the carrier for said scoring apparatus being movable relative to the mold into and out of a position for bringing the scoring discs within the mold, and a pressure pipe through which pneumatic pressure is supplied to the piston motors and thereby projects the scoring discs into contact with said surface and holds them against the surface with a yielding pressure, and means for rotating the mold about its vertical axis and thereby causing the scoring discs to traverse said surface with one disc following another in the score formed in the molded article.

10. The apparatus defined in claim 9 including means by which one scoring disc is moved into contact with the said surface and forms an initial score before the other disc contacts said surface so that the last-mentioned disc follows in the score formed by the first disc and deepens said score.

11. The combination set forth in claim 9, the said pressure pipe opening into one motor cylinder behind its piston at the rear end of the cylinder and a conduit extending from a point forward from said end of the cylinder to the other motor cylinder through which pneumatic pressure is supplied to the second motor cylinder, the said conduit being closed by the first motor piston while the latter is fully retracted and opened during the forward movement of the piston, whereby the first scoring disc is projected into operative position and forms an initial score into which the second disc is projected by the second motor piston.

12. The apparatus defined in claim 1, the means for holding the scoring elements in contact with said surface comprising fluid operated motors operable to hold the scoring elements in contact with said surface with a pressure maintained during the scoring operation.

References Cited in the file of this patent

UNITED STATES PATENTS

| | | |
|---|---|---|
| 672,281 | Morrison | Apr. 16, 1901 |
| 846,316 | Keyes | Mar. 5, 1907 |
| 1,124,784 | Monro | Jan. 12, 1915 |
| 2,205,564 | Johnstone | June 25, 1940 |
| 2,629,206 | Giffen et al. | Feb. 24, 1953 |
| 2,662,289 | Giffen | Dec. 15, 1953 |